(12) United States Patent
Huang

(10) Patent No.: US 10,142,614 B2
(45) Date of Patent: Nov. 27, 2018

(54) OMNIDIRECTIONAL THREE-DIMENSIONAL SCANNER

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 109 days.

(21) Appl. No.: 15/283,449

(22) Filed: Oct. 3, 2016

(65) Prior Publication Data

US 2018/0035099 A1 Feb. 1, 2018

(30) Foreign Application Priority Data

Jul. 29, 2016 (TW) .............................. 105124002 A

(51) Int. Cl.
*H04N 13/282* (2018.01)
*G06T 7/00* (2017.01)
*H04N 13/243* (2018.01)
*H04N 13/271* (2018.01)
*H04N 13/239* (2018.01)

(52) U.S. Cl.
CPC ......... *H04N 13/282* (2018.05); *G06T 7/0065* (2013.01); *H04N 13/243* (2018.05); *H04N 13/271* (2018.05); *G06T 2207/10028* (2013.01); *H04N 13/239* (2018.05); *H04N 2213/003* (2013.01)

(58) Field of Classification Search
CPC ....................................................... H04N 13/00
USPC ...................................................... 348/36–61
See application file for complete search history.

(56) References Cited

U.S. PATENT DOCUMENTS

| | | | |
|---|---|---|---|
| 6,917,702 B2 | 7/2005 | Beardsley et al. | |
| 2007/0181685 A1 | 8/2007 | Zhu et al. | |
| 2008/0306709 A1 | 12/2008 | Fisker et al. | |
| 2014/0225822 A1 | 8/2014 | Underkoffler et al. | |
| 2016/0212409 A1* | 7/2016 | Cole .................. | H04N 13/0022 |

FOREIGN PATENT DOCUMENTS

| | | |
|---|---|---|
| CN | 102364299 A | 2/2012 |
| CN | 103292697 A | 9/2013 |

* cited by examiner

*Primary Examiner* — Anand S Rao
(74) *Attorney, Agent, or Firm* — CKC & Partners Co., Ltd.

(57) ABSTRACT

An omnidirectional three-dimensional scanner includes a first image capturing module, a second image capturing module, a third image capturing module, a fourth image capturing module, and a fifth image capturing module. The first image capturing module, the second image capturing module, the third image capturing module, the fourth image capturing module, and the fifth image capturing module capture three-dimensional images of an object. The first image capturing module has a first image capturing surface. The second image capturing module has a second image capturing surface. The third image capturing module has a third image capturing surface. The fourth image capturing module has a fourth image capturing surface. The fifth image capturing module has a fifth image capturing surface. The first image capturing surface, the second image capturing surface, the third image capturing surface, the fourth image capturing surface, and the fifth image capturing surface form a virtual triangle column.

7 Claims, 7 Drawing Sheets

OMNIDIRECTIONAL THREE-DIMENSIONAL SCANNER

RELATED APPLICATIONS

This application claims priority to Taiwanese Application Serial Number 105124002, filed Jul. 29, 2016, which are herein incorporated by reference.

BACKGROUND

Technical Field

The present disclosure relates to an omnidirectional three-dimensional scanner.

Description of Related Art

A three-dimensional scanner detects and analyzes the shape of an object or an environment in the real world. Specifically, the three-dimensional scanner scans the object and establishes point cloud of the geometric surface of the object. The points in the point cloud can be transformed to the shape of the surface of the object. The denser are these points, the more precise a model is built. The three-dimensional scanner is similar to a still camera, and their sights are cone-shaped. Therefore, the three-dimensional scanner and the still camera can only collect information in a limited scopes. The difference between the three-dimensional scanner and the still camera is that the three-dimensional scanner also detects depth information. Because the scan scope of the three-dimensional scanner is limited, the relative positions of the scanner and the object need to be changed several times, or the object should be placed on a turnable table, so as to for a complete model of the object.

Much endeavor has been made in the industry to improve the performance of the three-dimensional scanner. Also, the application and improvement of three-dimensional scanner become one of the most important research topics.

SUMMARY

This disclosure provides an omnidirectional three-dimensional scanner to reduce the volume of the omnidirectional three-dimensional scanner and capture an omnidirectional three-dimensional image of an object quickly.

In one aspect of the disclosure, an omnidirectional three-dimensional scanner is provided. The omnidirectional three-dimensional scanner includes a first image capturing module, a second image capturing module, a third image capturing module, a fourth image capturing module, and a fifth image capturing module. The first image capturing module, the second image capturing module, the third image capturing module, the fourth image capturing module, and the fifth image capturing module capture three-dimensional images of an object. The first image capturing module has a first image capturing surface. The second image capturing module has a second image capturing surface. The third image capturing module has a third image capturing surface. The fourth image capturing module has a fourth image capturing surface. The fifth image capturing module has a fifth image capturing surface. The first image capturing surface, the second image capturing surface, the third image capturing surface, the fourth image capturing surface, and the fifth image capturing surface form a virtual triangle column.

In one or more embodiments, the first image capturing module, the second image capturing module, the third image capturing module, the fourth image capturing module, and the fifth image capturing module respectively capture a first two-dimensional image, a second two-dimensional image, a third two-dimensional image, a fourth two-dimensional image, and a fifth two-dimensional image of the object and capture a first depth information, a second depth information, a third depth information, a fourth depth information, and a fifth depth information respectively corresponding to the first two-dimensional image, the second two-dimensional image, the third two-dimensional image, the fourth two-dimensional image, and the fifth two-dimensional image.

In one or more embodiments, the first image capturing module, the second image capturing module, the third image capturing module, the fourth image capturing module, and the fifth image capturing module respectively capture a point cloud of the object.

In one or more embodiments, the omnidirectional three-dimensional scanner further includes a housing. A shape of the housing is a cuboid. The housing has a top surface, a bottom surface, and a first side surface, a second side surface, a third side surface, and a fourth side surface connected to the top surface and the bottom surface, and the first side surface is connected to the second side surface and the fourth side surface. The first image capturing module is disposed on the first side surface. The second image capturing module is disposed on the second side surface. The third image capturing module is disposed on the third side surface. The fourth image capturing module is disposed on the top surface. The fifth image capturing module is disposed on the bottom surface. The fourth side surface has an opening.

In one or more embodiments, an angle between the fourth image capturing surface and the second side surface is about 60°.

In one or more embodiments, an angle between the first image capturing surface and the first side surface is about 30°.

In one or more embodiments, the first image capturing module includes a first reflector and a first image capturing device. The first image capturing device captures a reflected three-dimensional image of the object formed by the first reflector. The second image capturing module includes a second reflector and a second image capturing device. The second image capturing device captures a reflected three-dimensional image of the object formed by the second reflector. The third image capturing module includes a third reflector and a third image capturing device. The third image capturing device captures a reflected three-dimensional image of the object formed by the third reflector. The fourth image capturing module includes a fourth reflector and a fourth image capturing device. The fourth image capturing device captures a reflected three-dimensional image of the object formed by the fourth reflector. The fifth image capturing module includes a fifth reflector and a fifth image capturing device. The fifth image capturing device captures a reflected three-dimensional image of the object formed by the fifth reflector.

In one or more embodiments, the first reflector is disposed on the first side surface. The second reflector is disposed on the second side surface. The third reflector is disposed on the third side surface. The fourth reflector is disposed on the top surface. The fifth reflector is disposed on the bottom surface.

In one or more embodiments, the first image capturing device has a first optical axis, and an angle between the first optical axis and the first reflector is about 60°. The second image capturing device has a second optical axis, and an angle between the second optical axis and the second reflector is about 60°. The third image capturing device has a third optical axis, and an angle between the third optical axis and the third reflector is about 60°. The fourth image capturing device has a fourth optical axis, and an angle between the fourth optical axis and the fourth reflector is about 60°. The fifth image capturing device has a fifth optical axis, and an angle between the fifth optical axis and the fifth reflector is about 60°.

In one or more embodiments, the first image capturing device, the second image capturing device, the third image capturing device, the fourth image capturing device, and the fifth image capturing device are stereo cameras, light-field cameras, or image capturing devices with structured lighting.

By the aforementioned optical path configuration, the omnidirectional three-dimensional image of the object can be quickly captured when the first image capturing module, the second image capturing module, the third image capturing module, the fourth image capturing module, and the fifth image capturing module are fixed. Therefore, the omnidirectional three-dimensional scanner can capture the omnidirectional three-dimensional image of the object quickly. In addition, by the aforementioned configuration, the first image capturing module, the second image capturing module, the third image capturing module, the fourth image capturing module, and the fifth image capturing module are respectively disposed on five surfaces of the housing, and there is no image capturing module disposed on one surface of the housing (the fourth side surface), such that the opening can be disposed on the fourth side surface and the object can enter and leave the housing through the opening. Therefore, the internal space of the housing can be effectively used, and the size of the housing and the overall volume of the omnidirectional three-dimensional scanner can also be as small as possible.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
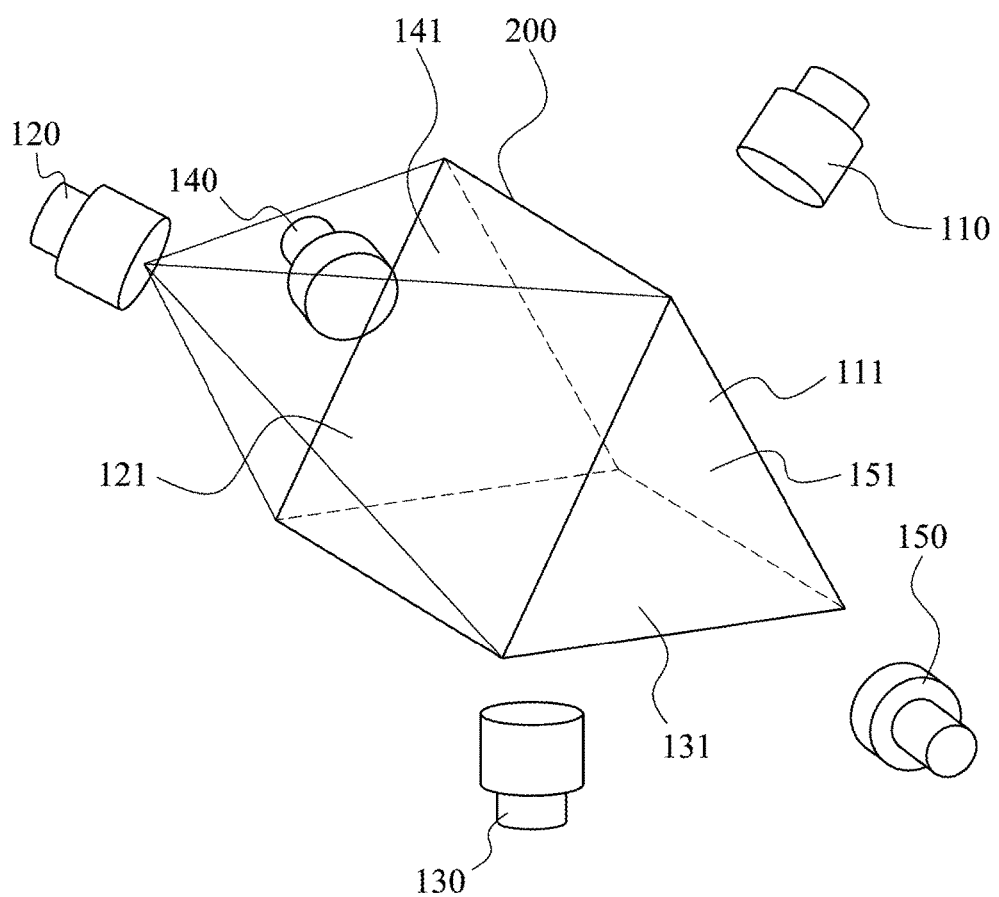
FIG. 1 is a schematic perspective view of an omnidirectional three-dimensional scanner according to one embodiment of this disclosure.

FIG. 1 is a schematic perspective view of an omnidirectional three-dimensional scanner 100 according to one embodiment of this disclosure. An omnidirectional three-dimensional scanner 100 is provided. The omnidirectional three-dimensional scanner 100 is used to capture an omnidirectional three-dimensional image of an object quickly.

As shown in FIG. 1, the omnidirectional three-dimensional scanner 100 includes a first image capturing module 110, a second image capturing module 120, a third image capturing module 130, a fourth image capturing module 140, and a fifth image capturing module 150. The first image capturing module 110, the second image capturing module 120, the third image capturing module 130, the fourth image capturing module 140, and the fifth image capturing module 150 respectively capture three-dimensional images of the object. The first image capturing module 110 has a first image capturing surface 111. The second image capturing module 120 has a second image capturing surface 121. The third image capturing module 130 has a third image capturing surface 131. The fourth image capturing module 140 has a fourth image capturing surface 141. The fifth image capturing module 150 has a fifth image capturing surface 151. The first image capturing surface 111, the second image capturing surface 121, the third image capturing surface 131, the fourth image capturing surface 141, and the fifth image capturing surface 151 form a virtual triangle column 200. The object (not shown in Figs.) is disposed in the virtual triangle column 200.

By the aforementioned optical path configuration, the omnidirectional three-dimensional image of the object can be quickly captured when the first image capturing module 110, the second image capturing module 120, the third image capturing module 130, the fourth image capturing module 140, and the fifth image capturing module 150 are fixed. Therefore, the omnidirectional three-dimensional scanner 100 can capture the omnidirectional three-dimensional image of the object quickly.

In some embodiments, the first image capturing module 110 captures the three-dimensional image of the object by the first image capturing surface 111. The second image capturing module 120 captures the three-dimensional image of the object by the second image capturing surface 121. The third image capturing module 130 captures the three-dimensional image of the object by the third image capturing surface 131. The fourth image capturing module 140 captures the three-dimensional image of the object by the fourth image capturing surface 141. The fifth image capturing module 150 captures the three-dimensional image of the object by the fifth image capturing surface 151. Because the object is located in the virtual triangle column 200, so the first image capturing surface 111, the second image capturing surface 121, the third image capturing surface 131, the fourth image capturing surface 141, and the fifth image capturing surface 151 completely cover the object, such that the three-dimensional images respectively captured by the first image capturing module 110, the second image capturing module 120, the third image capturing module 130, the fourth image capturing module 140, and the fifth image capturing module 150 can form the omnidirectional three-dimensional image of the object by combining the three-dimensional images.

Figure 2:
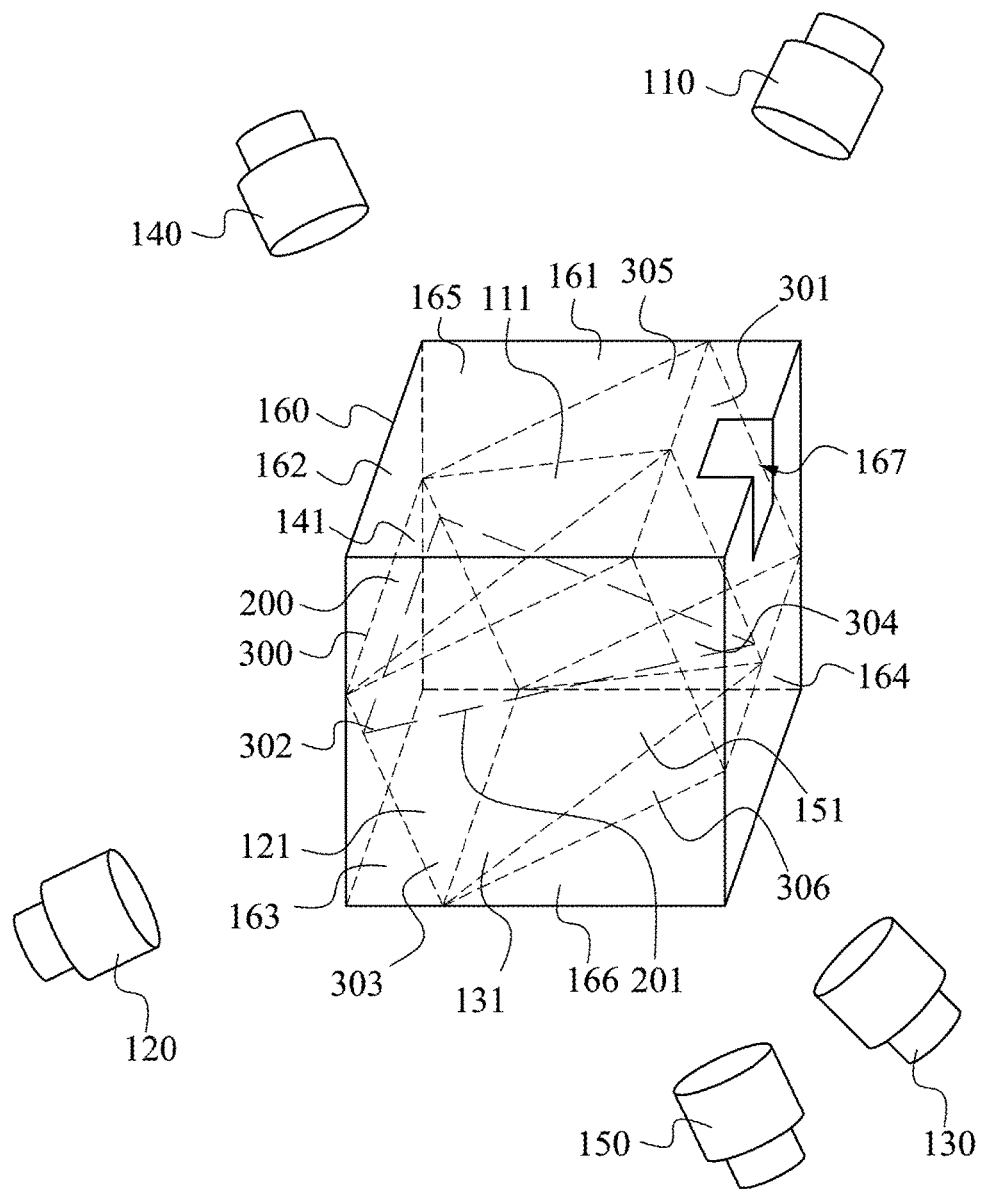
FIG. 2 is another schematic perspective view of the omnidirectional three-dimensional scanner according to one embodiment of this disclosure.

FIG. 2 is another schematic perspective view of the omnidirectional three-dimensional scanner 100 according to one embodiment of this disclosure. As shown in FIG. 2, the omnidirectional three-dimensional scanner 100 further includes a housing 160. The shape of the housing 160 is a cuboid. The housing 160 has a top surface 165, a bottom surface 166, and a first side surface 161, a second side surface 162, a third side surface 163, and a fourth side surface 164 connected to the top surface 165 and the bottom surface 166. The first side surface 161 is connected to the second side surface 162 and the fourth side surface 164, and the first side surface 161 is opposed to the third side surface 163. The second side surface 162 is connected to the first side surface 161 and the third side surface 163, and the second side surface 162 is opposed to the fourth side surface 164. The first image capturing module 110 is disposed on the first side surface 161. The second image capturing module 120 is disposed on the second side surface 162. The third image capturing module 130 is disposed on the third side surface 163. The fourth image capturing module 140 is disposed on the top surface 165. The fifth image capturing module 150 is disposed on the bottom surface 166. The fourth side surface 164 has an opening 167.

By the aforementioned configuration, the first image capturing module 110, the second image capturing module 120, the third image capturing module 130, the fourth image capturing module 140, and the fifth image capturing module 150 are respectively disposed on five surfaces of the housing 160, and there is no image capturing module disposed on one surface of the housing 160 (the fourth side surface 164), such that the opening 167 can be disposed on the fourth side surface 164 and the object can enter and leave the housing 160 through the opening 167. Therefore, the internal space of the housing 160 can be effectively used, and the size of the housing 160 and the overall volume of the omnidirectional three-dimensional scanner 100 can also be as small as possible.

Figure 3:
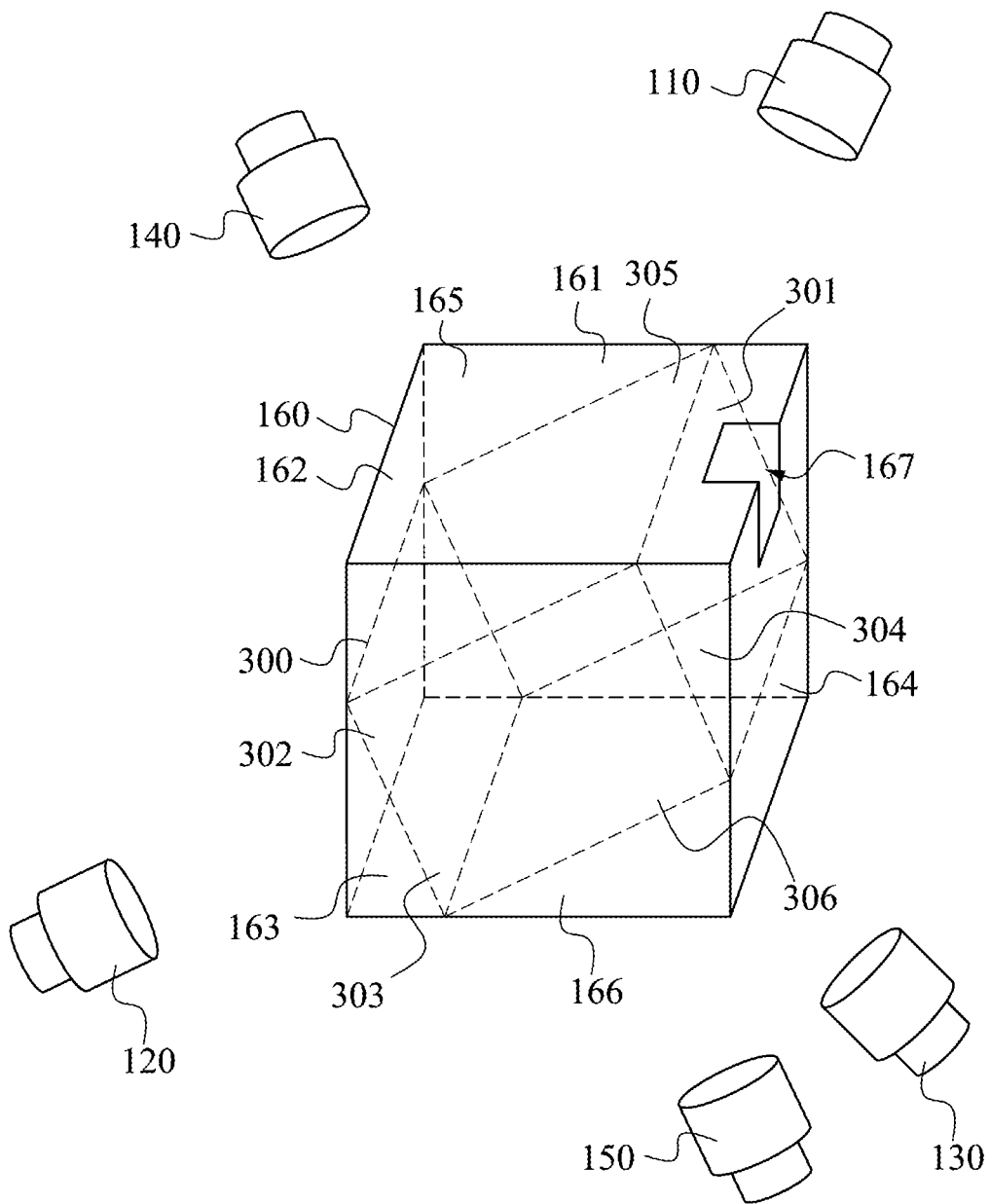
FIG. 3 is another schematic perspective view of the omnidirectional three-dimensional scanner according to one embodiment of this disclosure.

FIG. 3 is another schematic perspective view of the omnidirectional three-dimensional scanner 100 according to one embodiment of this disclosure. As shown in FIG. 2 and FIG. 3, a virtual cuboid 300 is disposed in the housing 160, and the virtual triangle column 200 is located in the virtual cuboid 300. The virtual cuboid 300 has a top surface 305, a bottom surface 306, and a side surface 301, a second side surface 302, a third side surface 303, and a fourth side surface 304 connected to the top surface 305 and the bottom surface 306. The first side surface 301 is connected to the second side surface 302 and the fourth side surface 304, and the first side surface 301 is opposed to the third side surface 303. The second side surface 302 is connected to the first side surface 301 and the third side surface 303, and the second side surface 302 is opposed to the fourth side surface 304. The first side surface 301 is disposed on the first side surface 161. The third side surface 303 is disposed on the third side surface 163. Four edges of the second side surface 302 are respectively disposed on the first side surface 161, the second side surface 162, the third side surface 163, and the bottom surface 166. Four edges of the fourth side surface 304 are respectively disposed on the first side surface 161, the third side surface 163, the fourth side surface 164, and the top surface 165. Four edges of the top surface 305 are respectively disposed on the first side surface 161, the second side surface 162, the third side surface 163, and the top surface 165. Four edges of the bottom surface 306 are respectively disposed on the first side surface 161, the third side surface, the fourth side surface 164, and the bottom surface 166.

Figure 4:
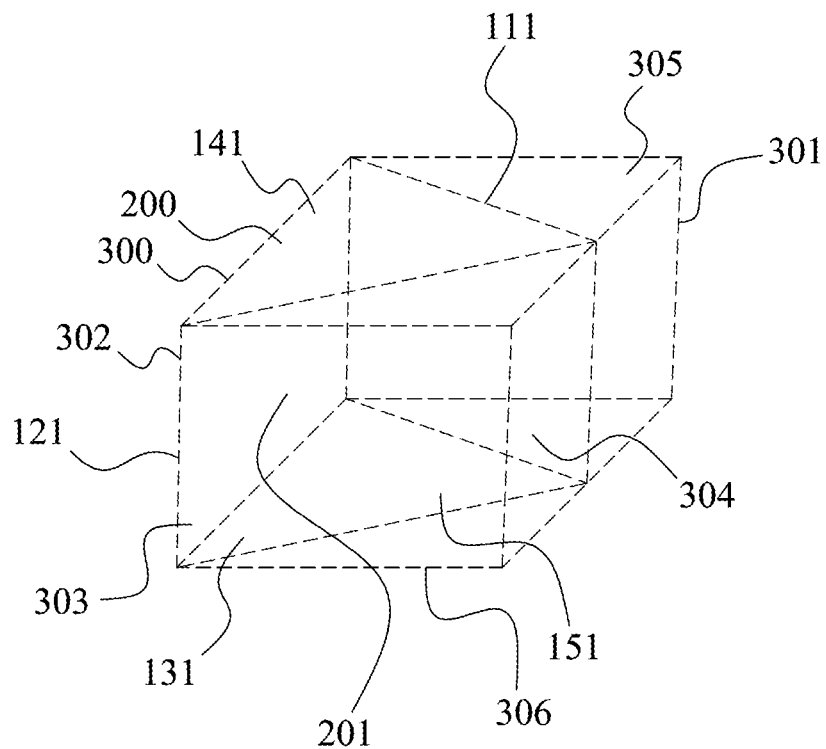
FIG. 4 is a schematic perspective view of a virtual cuboid and a virtual triangle column according to one embodiment of this disclosure.

FIG. 4 is a schematic perspective view of the virtual cuboid 300 and the virtual triangle column 200 according to one embodiment of this disclosure. As shown in FIG. 2 and FIG. 4, the shape of the first image capturing surface 111, the second image capturing surface 121, and the third image capturing surface 131 are rectangles, and the shapes of the fourth image capturing surface 141 and the fifth image capturing surface 151 are triangles. The second image capturing surface 121 is located on the second side surface 302, and the second image capturing surface 121 overlaps the second side surface 302. The fourth image capturing surface 141 is located on the top surface 305. The fifth image capturing surface 151 is located on the bottom surface 306. Four edges of the first image capturing surface 111 are respectively located on the first side surface 161, the top surface 305, the bottom surface 306, and the fourth side surface 304. Four edges of the third image capturing surface 131 are respectively located on the third side surface 163, the top surface 305, the bottom surface 306, and the fourth side surface 304.

As shown in FIG. 2, FIG. 3, and FIG. 4, an angle between the second side surface 302 and the second side surface 162 is about 30°. In other words, an angle between the fourth image capturing surface 141 and the second side surface 162 is about 60°. Embodiments of this disclosure are not limited thereto. The person having ordinary skill in the art can make proper modifications to the second side surface 302, the fourth image capturing surface 141, and the second side surface 162 depending on the actual application.

In some embodiments, an angle between the first image capturing surface 111 and the first side surface 161 is about 30°. The person having ordinary skill in the art can make proper modifications to the first image capturing surface 111 and the first side surface 161 depending on the actual application.

In some embodiments, an angle between the third image capturing surface 131 and the third side surface 163 is about 30°. The person having ordinary skill in the art can make proper modifications to the third image capturing surface 131 and the third side surface 163 depending on the actual application.

Figure 5:
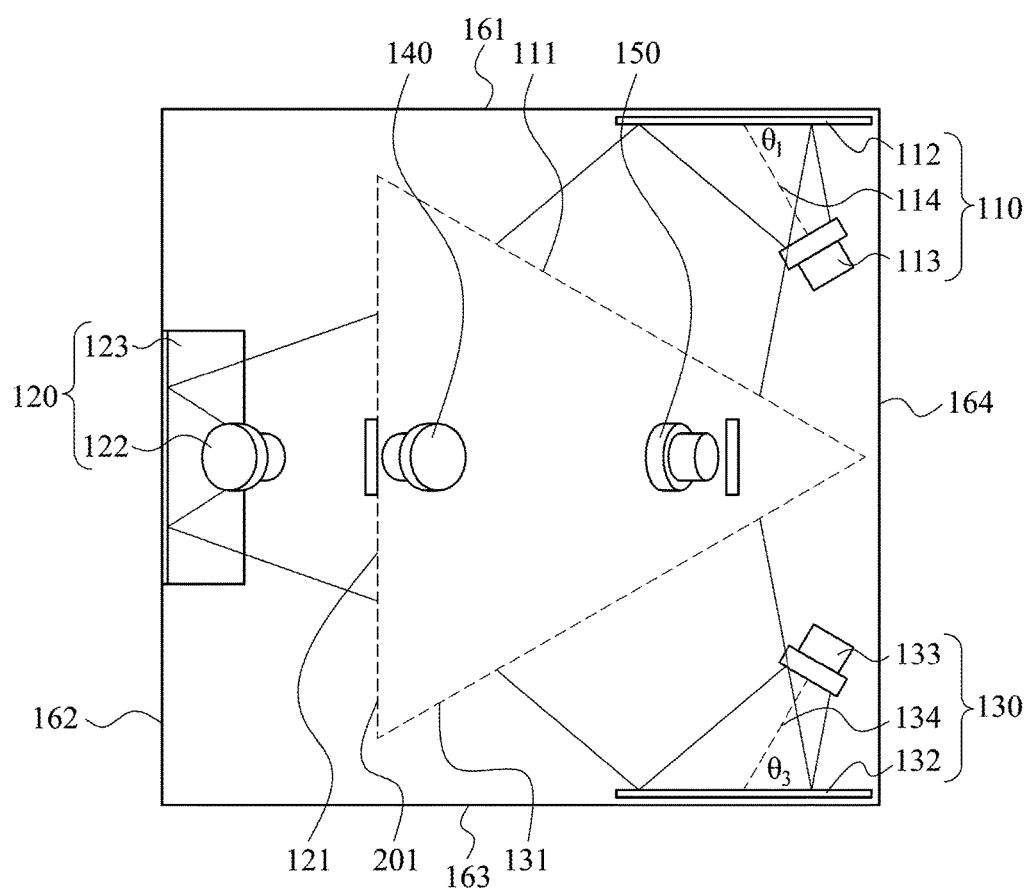
FIG. 5 is a schematic top view of the omnidirectional three-dimensional scanner according to one embodiment of this disclosure.
Figure 6:
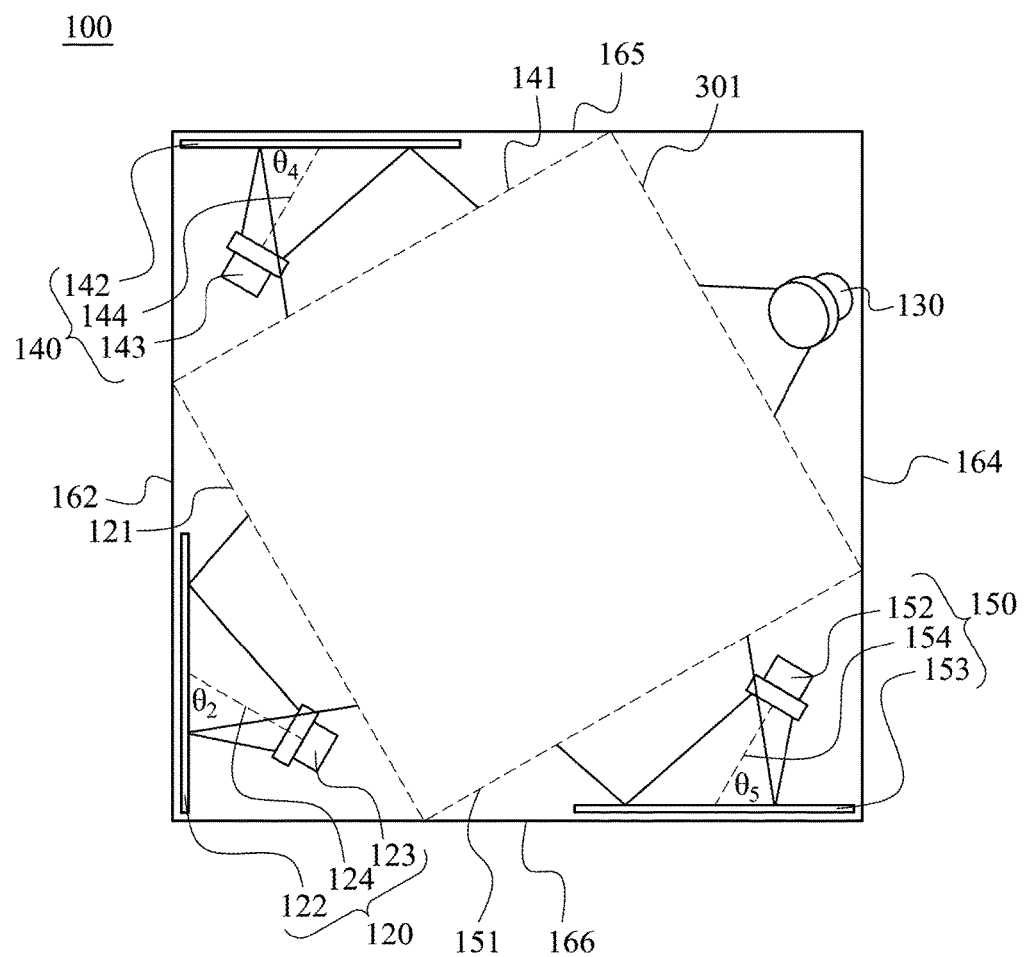
FIG. 6 is a schematic side view of the omnidirectional three-dimensional scanner according to one embodiment of this disclosure.

FIG. 5 is a schematic top view of the omnidirectional three-dimensional scanner 100 according to one embodiment of this disclosure, in which the section 201 corresponds to the section 201 of FIG. 2. FIG. 6 is a schematic side view of the omnidirectional three-dimensional scanner 100 according to one embodiment of this disclosure. As shown in FIG. 5 and FIG. 6, the first image capturing module 110 includes a first reflector 112 and a first image capturing device 113. The first image capturing device 113 captures a reflected three-dimensional image of the object formed by the first reflector 112. The second image capturing module 120 includes a second reflector 122 and a second image capturing device 123. The second image capturing device 123 captures a reflected three-dimensional image of the object formed by the second reflector 122. The third image capturing module 130 includes a third reflector 132 and a third image capturing device 133. The third image capturing device 133 captures a reflected three-dimensional image of the object formed by the third reflector 132. The fourth image capturing module 140 includes a fourth reflector 142 and a fourth image capturing device 143. The fourth image capturing device 143 captures a reflected three-dimensional image of the object formed by the fourth reflector 142. The fifth image capturing module 150 includes a fifth reflector 152 and a fifth image capturing device 153. The fifth image capturing device 153 captures a reflected three-dimensional image of the object formed by the fifth reflector 152.

The first reflector 112 is disposed on the first side surface 161. The second reflector 122 is disposed on the second side surface 162. The third reflector 132 is disposed on the third side surface 163. The fourth reflector 142 is disposed on the top surface 165. The fifth reflector 152 is disposed on the bottom surface 166. Embodiments of this disclosure are not limited thereto. The person having ordinary skill in the art can make proper modifications to the first reflector 112, the second reflector 122, the third reflector 132, the fourth reflector 142, the fifth reflector 152, and the housing 160 depending on the actual application.

The first image capturing device 113 has a first optical axis 114, and an angle $\theta_1$ between the first optical axis 114 and the first reflector 112 is about 60°. The second image capturing device 123 has a second optical axis 124, and an angle $\theta_2$ between the second optical axis 124 and the second reflector 122 is about 60°. The third image capturing device 133 has a third optical axis 134, and an angle $\theta_3$ between the third optical axis 134 and the third reflector 132 is about 60°. The fourth image capturing device 143 has a fourth optical axis 144, and an angle $\theta_4$ between the fourth optical axis 144 and the fourth reflector 142 is about 60°. The fifth image capturing device 153 has a fifth optical axis 154, and an angle $\theta_5$ between the fifth optical axis 154 and the fifth reflector 152 is about 60°. Embodiments of this disclosure are not limited thereto. The person having ordinary skill in the art can make proper modifications to the first reflector 112, the first image capturing device 113, the second reflector 122, the second image capturing device 123, the third reflector 132, the third image capturing device 133, the fourth reflector 142, the fourth image capturing device 143, the fifth reflector 152, and the fifth image capturing device 153 depending on the actual application.

As shown in FIG. 2, FIG. 5, and FIG. 6, the opening 167 can be extended to the top surface 165. At the same time, the opening 167 will not be blocked by the image capturing module nearest to the opening 167 (i.e., the first image capturing module 110 and the second image capturing module 120).

Figure 7:
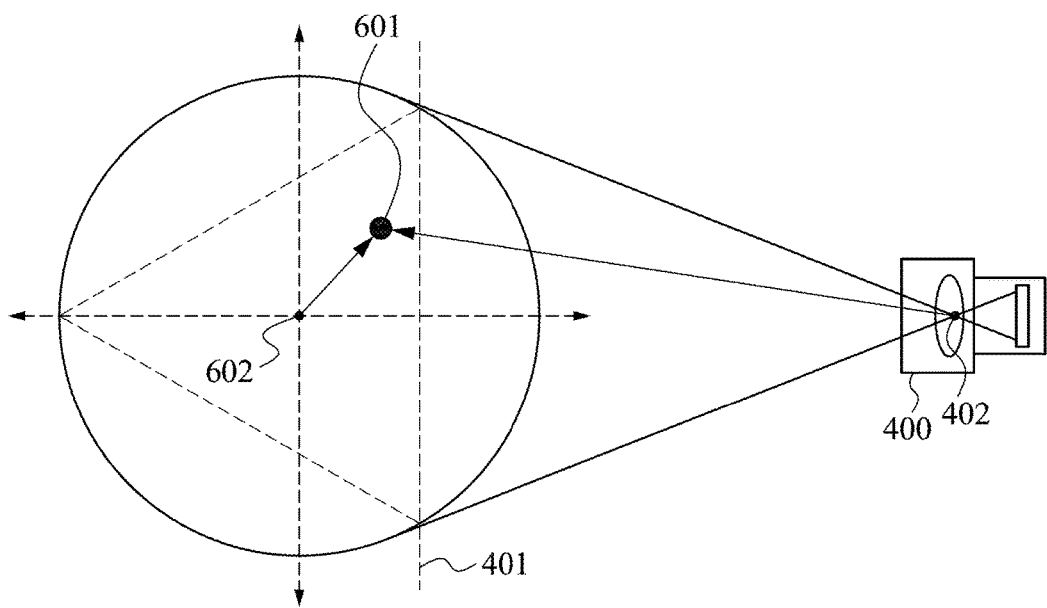
FIG. 7 is a schematic side view of an image capturing module and an object according to one embodiment of this disclosure.

FIG. 7 is a schematic side view of an image capturing module 400 and an object according to one embodiment of this disclosure. As shown in FIG. 7, the image capturing device 400 captures a point cloud of the object, and one point of the point cloud is shown in FIG. 7. In some embodiment, the image capturing device 400 captures a two-dimensional image of the object located on the image capturing surface 401 and a depth information corresponding to the two-dimensional image. Therefore, the depth of each point in the two-dimensional image relative to the image capturing surface 401 can be known, and each point of two-dimensional image, for example, a point 601, relative to the original point 402 of the image capturing device coordinates can be known. Then, the coordinates of each point in the two-dimensional image relative to the original point 402 of the image capturing device coordinates can be transformed into the coordinates of each point in the two-dimensional image relative to the original point 602 of the object coordinates.

The image capturing device 400 can be the first image capturing device 113, the second image capturing device 123, the third image capturing device 133, the fourth image capturing device 143, and the fifth image capturing device 153. It is noted that no reflector is shown in FIG. 7. However, whether there is a reflector in the optical system basically does not influence the mechanism how the image capturing device 400 captures the point cloud of the object.

After the coordinates of each point in the two-dimensional images on the first image capturing surface 111, the second image capturing surface 112, the third image capturing surface 131, the fourth image capturing surface 141, and the fifth image capturing surface 151 relative to original points of the corresponding image capturing device coordinates are known through the first image capturing device 113, the second image capturing device 123, the third image capturing device 133, the fourth image capturing device 143, and the fifth image capturing device 153, the coordinates of the points can be transform to the coordinates of points relative to the original point 602 of the object coordinates. Then, the omnidirectional three-dimensional image of the object can be obtained by integrating all the coordinates of the points.

The image capturing device 400 (or the first image capturing device 113, the second image capturing device 123, the third image capturing device 133, the fourth image capturing device 143, and the fifth image capturing device 153) may be stereo cameras, light-field cameras, or image capturing devices with structured lighting. Embodiments of this disclosure are not limited thereto. The person having ordinary skill in the art can make proper modifications to the image capturing device 400 depending on the actual application.

By the aforementioned optical path configuration, the omnidirectional three-dimensional image of the object can be quickly captured when the first image capturing module 110, the second image capturing module 120, the third image capturing module 130, the fourth image capturing module 140, and the fifth image capturing module 150 are fixed. Therefore, the omnidirectional three-dimensional scanner 100 can capture the omnidirectional three-dimensional image of the object quickly.

In addition, by the aforementioned configuration, the first image capturing module 110, the second image capturing module 120, the third image capturing module 130, the fourth image capturing module 140, and the fifth image capturing module 150 are respectively disposed on five surfaces of the housing 160, and there is no image capturing module disposed on one surface of the housing 160 (the fourth side surface 164), such that the opening 167 can be disposed on the fourth side surface 164 and the object can enter and leave the housing 160 through the opening 167. Therefore, the internal space of the housing 160 can be effectively used, and the size of the housing 160 and the overall volume of the omnidirectional three-dimensional scanner 100 can also be as small as possible.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. § 112, 6th paragraph. In particular, the use of "step of" in the claims herein is not intended to invoke the provisions of 35 U.S.C. § 112, 6th paragraph.

What is claimed is:

1. An omnidirectional three-dimensional scanner, comprising:
a first image capturing module, a second image capturing module, a third image capturing module, a fourth image capturing module, a fifth image capturing module respectively configured to capture three-dimensional images of an object, wherein the first image capturing module has a first image capturing surface, the second image capturing module has a second image capturing surface, the third image capturing module has a third image capturing surface, the fourth image capturing module has a fourth image capturing surface, the fifth image capturing module has a fifth image capturing surface, and the first image capturing surface, the second image capturing surface, the third image capturing surface, the fourth image capturing surface, and the fifth image capturing surface form a virtual triangle column; and
a housing, wherein a shape of the housing is a cuboid, and the housing has a top surface, a bottom surface, and a first side surface, a second side surface, a third side surface, and a fourth side surface connected to the top surface and the bottom surface, wherein the first side surface is connected to the second side surface and the fourth side surface, the first image capturing module is disposed on the first side surface, the second image capturing module is disposed on the second side surface, the third image capturing module is disposed on the third side surface, the fourth image capturing module is disposed on the top surface, the fifth image capturing module is disposed on the bottom surface, and the fourth side surface has an opening;
wherein the first image capturing module comprises a first reflector and a first image capturing device that is configured to capture a reflected three-dimensional image of the object formed by the first reflector; the second image capturing module comprises a second reflector and a second image capturing device that is configured to capture a reflected three-dimensional image of the object formed by the second reflector; the third image capturing module comprises a third reflector and a third image capturing device that is configured to capture a reflected three-dimensional image of the object formed by the third reflector; the fourth image capturing module comprises a fourth reflector and a fourth image capturing device that is configured to capture a reflected three-dimensional image of the object formed by the fourth reflector; and the fifth image capturing module comprises a fifth reflector and a fifth image capturing device that is configured to capture a reflected three-dimensional image of the object formed by the fifth reflector; and
wherein the first reflector is disposed on the first side surface, the second reflector is disposed on the second side surface, the third reflector is disposed on the third side surface, the fourth reflector is disposed on the top surface, and the fifth reflector is disposed on the bottom surface.

2. The omnidirectional three-dimensional scanner of claim 1, wherein the first image capturing module, the second image capturing module, the third image capturing module, the fourth image capturing module, and the fifth image capturing module respectively configured to capture a first two-dimensional image, a second two-dimensional image, a third two-dimensional image, a fourth two-dimensional image, and a fifth two-dimensional image of the object and to capture a first depth information, a second depth information, a third depth information, a fourth depth information, and a fifth depth information respectively corresponding to the first two-dimensional image, the second two-dimensional image, the third two-dimensional image, the fourth two-dimensional image, and the fifth two-dimensional image.

3. The omnidirectional three-dimensional scanner of claim 1, wherein the first image capturing module, the second image capturing module, the third image capturing module, the fourth image capturing module, and the fifth image capturing module respectively configured to capture a point cloud of the object.

4. The omnidirectional three-dimensional scanner of claim 1, wherein an angle between the fourth image capturing surface and the second side surface is about 60°.

5. The omnidirectional three-dimensional scanner of claim 1, wherein an angle between the first image capturing surface and the first side surface is about 30°.

6. The omnidirectional three-dimensional scanner of claim 1, wherein the first image capturing device has a first optical axis, wherein an angle between the first optical axis and the first reflector is about 60°; the second image capturing device has a second optical axis, wherein an angle between the second optical axis and the second reflector is about 60°; the third image capturing device has a third optical axis, wherein an angle between the third optical axis and the third reflector is about 60°; the fourth image capturing device has a fourth optical axis, wherein an angle between the fourth optical axis and the fourth reflector is about 60°; and the fifth image capturing device has a fifth optical axis, wherein angle between the fifth optical axis and the fifth reflector is about 60°.

7. The omnidirectional three-dimensional scanner of claim 1, wherein the first image capturing device, the second image capturing device, the third image capturing device, the fourth image capturing device, and the fifth image capturing device are stereo cameras, light-field cameras, or image capturing devices with structured lighting.

* * * * *